(12) United States Patent
Zhang et al.

(10) Patent No.: US 9,920,615 B2
(45) Date of Patent: Mar. 20, 2018

(54) HYDRAULIC FRACTURING SYSTEM AND METHOD FOR DETECTING PUMP FAILURE OF SAME

(71) Applicant: Caterpillar Inc., Peoria, IL (US)

(72) Inventors: Yanchai Zhang, Dunlap, IL (US);
Derek Paul Kamp, Houston, TX (US);
Venkata Bhagavathi Dandibhotla, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/229,347

(22) Filed: Aug. 5, 2016

(65) Prior Publication Data

US 2018/0038216 A1     Feb. 8, 2018

(51) Int. Cl.
*G01L 3/00* (2006.01)
*E21B 47/00* (2012.01)
*E21B 43/26* (2006.01)
*G01L 5/00* (2006.01)

(52) U.S. Cl.
CPC .......... *E21B 47/0007* (2013.01); *E21B 43/26* (2013.01); *G01L 3/00* (2013.01); *G01L 5/0061* (2013.01)

(58) Field of Classification Search
CPC ..... G01L 3/00; G01L 5/0061; E21B 47/0007; E21B 43/26
USPC ....................................................... 73/862.08
See application file for complete search history.

(56) References Cited

U.S. PATENT DOCUMENTS

| | | | |
|---|---|---|---|
| 5,686,669 A | 11/1997 | Hernandez et al. | |
| 6,757,665 B1* | 6/2004 | Unsworth | F04D 15/0077 706/15 |
| 7,308,322 B1* | 12/2007 | Discenzo | G05B 23/0221 700/175 |
| 2010/0217470 A1* | 8/2010 | Aldrich, III | F04B 51/00 701/31.4 |
| 2010/0258093 A1* | 10/2010 | Cinpinski | F02D 41/221 123/508 |
| 2012/0282115 A1* | 11/2012 | Du | F04B 23/06 417/53 |
| 2013/0226458 A1* | 8/2013 | Nakamura | G01R 21/00 702/3 |
| 2014/0244049 A1* | 8/2014 | Villareal | E21B 49/10 700/282 |
| 2016/0168979 A1* | 6/2016 | Zhang | E21B 47/06 73/152.61 |

* cited by examiner

*Primary Examiner* — Max Noori

(57) ABSTRACT

A hydraulic fracturing system with pump failure detection includes an engine, transmission, hydraulic fracturing pump and a driveshaft coupled between the transmission and the hydraulic fracturing pump to transfer torque from the engine to the hydraulic fracturing pump. A torque sensor is positioned and configured to measure torque acting on the driveshaft, with the torque sensor generating torque measurement data. A controller is programmed to analyze the torque measurement data and identify a pump failure mode based on the torque measurement data.

20 Claims, 6 Drawing Sheets

US 9,920,615 B2

HYDRAULIC FRACTURING SYSTEM AND METHOD FOR DETECTING PUMP FAILURE OF SAME

TECHNICAL FIELD

The present disclosure relates generally to a hydraulic fracturing system, and more particularly to a system and method for detecting a pump failure of the hydraulic fracturing system using a driveshaft torque measurement.

BACKGROUND

Hydraulic fracturing is a means for extracting oil and gas from rock, typically to supplement a horizontal drilling operation. In particular, high pressure fluid is used to fracture the rock, simulating the flow of oil and gas through the rock to increase the volumes of oil or gas that can be recovered. The system used to inject the high pressure fluid, or fracturing fluid, includes, among other components, an engine, transmission, driveshaft and pump. Monitoring and prognostics for all aspects of this system are beneficial to initiate maintenance and reduce unplanned downtown.

U.S. Pat. No. 5,686,669 to Hernandez et al. (hereinafter "Hernandez") applies to an apparatus and method for analyzing the condition and performance of turbomachines by processing signals representing rotor motion. In particular, the Hernandez reference teaches sensors for detecting rotor vibrations and resonances in turbomachines. The resulting signals are processed in a series of steps, including a step to isolate signal components due to rotational vibration from those due to translational vibration, to detect impending rotor failures.

As should be appreciated, there is a continuing need to improve efficiency and reliability of this heavy duty equipment used in hydraulic fracturing.

SUMMARY OF THE INVENTION

In one aspect, a hydraulic fracturing system with pump failure detection includes an engine, transmission, hydraulic fracturing pump and a driveshaft coupled between the transmission and the hydraulic fracturing pump to transfer torque from the engine to the hydraulic fracturing pump. A torque sensor is positioned and configured to measure torque acting on the driveshaft, with the torque sensor generating torque measurement data. A controller is programmed to analyze the torque measurement data and identify a pump failure mode based on the torque measurement data.

In another aspect, a method for detecting a pump failure of a hydraulic fracturing system is provided. The hydraulic fracturing system includes an engine, a transmission, a hydraulic fracturing pump, a driveshaft coupled between the transmission and the hydraulic fracturing pump, a torque sensor and a controller. The method includes steps of measuring torque acting on the driveshaft using the torque sensor, generating the torque measurement data using the controller and identifying a pump failure mode based on the torque measurement data.

In another aspect, a control system for a hydraulic fracturing system with pump failure detection includes a controller programmed to receive torque measurement data representative of torque acting on a driveshaft coupled between a transmission and a hydraulic fracturing pump. The controller is also programmed to convert the torque measurement data from a time domain to a frequency domain, and identify a pump failure mode based on the torque measurement data in the frequency domain.

DETAILED DESCRIPTION

Figure 1:
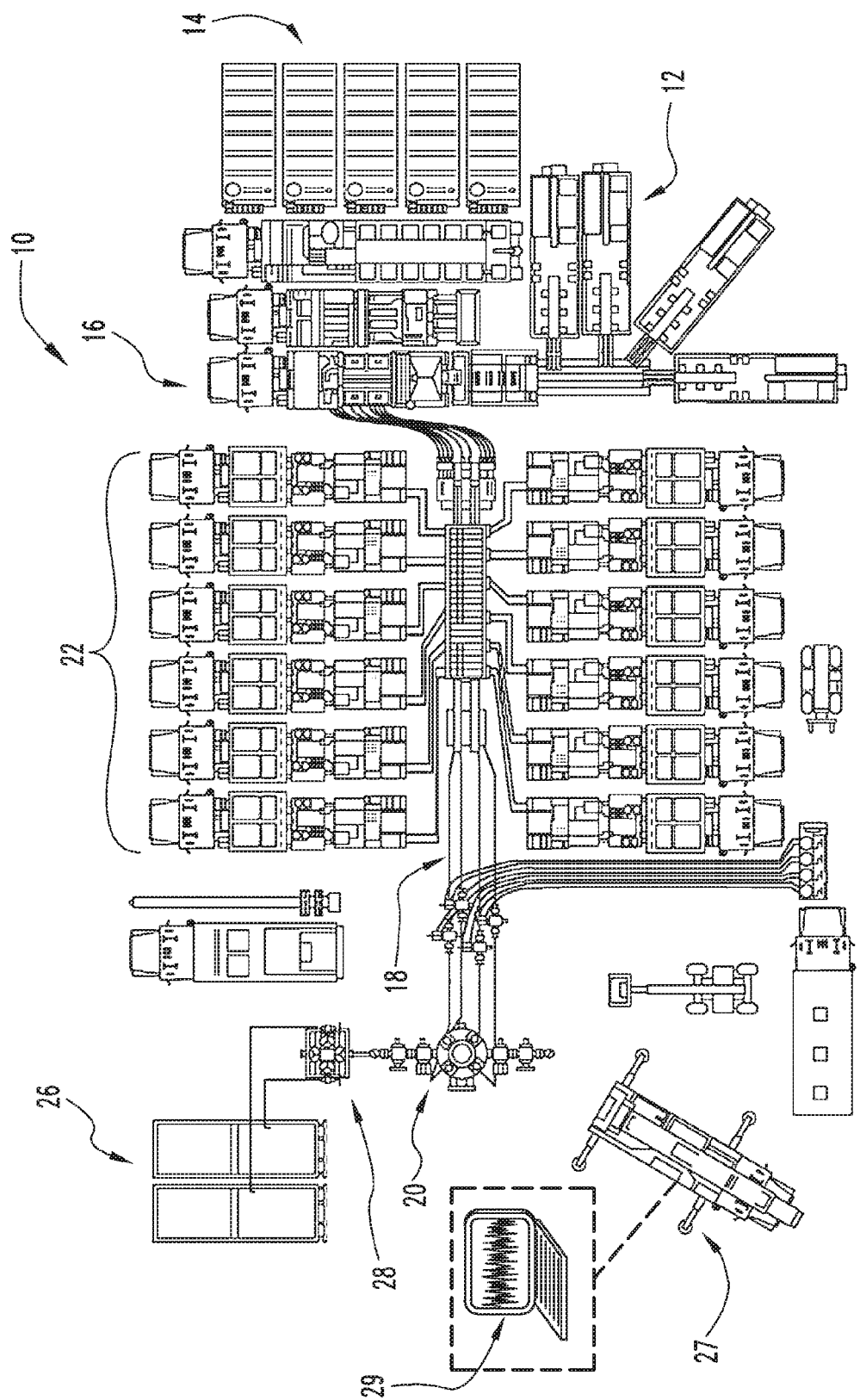
FIG. 1 is a schematic diagram of an exemplary hydraulic fracturing site, according to the present disclosure.

An exemplary hydraulic fracturing site according to the present disclosure is shown generally at 10 in FIG. 1. In particular, FIG. 1 depicts an exemplary site layout according to a well stimulation stage (i.e., hydraulic fracturing stage) of a drilling/mining process, such as after a well has been drilled at the site 10 and the equipment used for drilling removed. The site 10 may include a fluid storage tank 12, a sand storage tank 14 and blending equipment 16 for preparing a fracturing fluid. The fracturing fluid, which may, for example, include water, sand, and one or more chemicals, may be injected at high pressure through one or more fluid lines 18 to a well head 20 using one or more hydraulic fracturing system(s) 22.

A bleed off tank 24 may be provided to receive bleed off liquid or gas from the fluid lines 18, as is known to those skilled in the art. In addition, and according to some embodiments, nitrogen, which may be beneficial to the hydraulic fracturing process for a variety of reasons, may be stored in tanks 26, with a pumping system 28 used to supply the nitrogen from the tanks 26 to the fluid lines 18 or well head 20.

The hydraulic fracturing process performed at the site 10, and the equipment used in the process, may be managed and/or monitored from a single location, such as a data monitoring system 27. According to an example, the data monitoring system 27 may be supported on a van, truck or may be otherwise mobile. As will be disclosed below, the data monitoring system 27 may include a display 29 for displaying data for monitoring performance of the hydraulic fracturing systems 22. According to one embodiment, the data gathered by the data monitoring system 27 may be sent off-board or off-site for monitoring performance and/or performing calculations relative to the hydraulic fracturing site 10.

Figure 2:
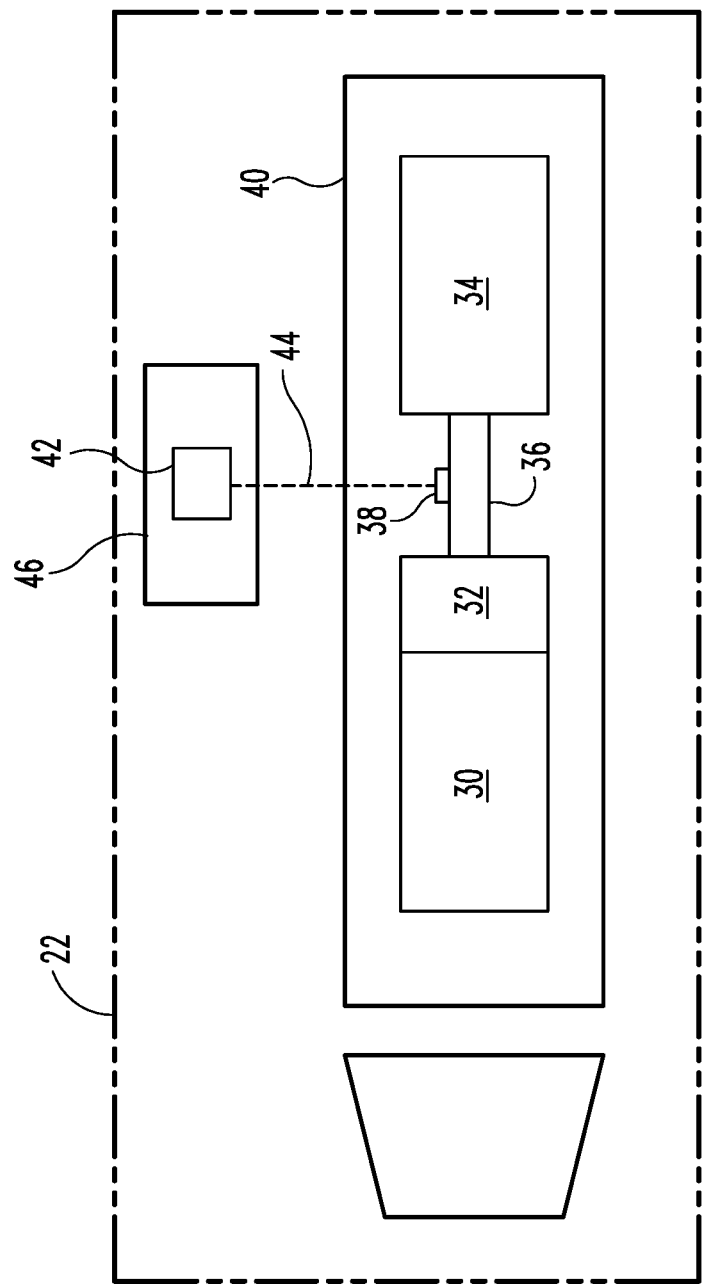
FIG. 2 is a schematic diagram of a hydraulic fracturing rig of the hydraulic fracturing site of FIG. 1, including a hydraulic fracturing system of the present disclosure.

Turning now to FIG. 2, the one or more hydraulic fracturing system(s) 22, according to the present disclosure, may each generally include an engine 30, or other source of power, a transmission 32 and a hydraulic fracturing pump 34. A driveshaft 36 may be coupled between the transmission 32 and the hydraulic fracturing pump 34 for transferring torque from the engine 30 to the hydraulic fracturing pump 34. A torque sensor 38 may be positioned and configured to measure torque acting on the driveshaft 36. According to some embodiments, the torque sensor 38 may be a strain gauge; however, other sensors may be used and may generate an electronic signal. This equipment (e.g., engine 30, transmission 32, hydraulic fracturing pump 34 and torque sensor 38) may be mobile, such as supported on a hydraulic fracturing rig 40, so that it may be more easily transported from site to site.

A controller 42, such as an electronic controller, may be configured to communicate with the torque sensor 38 via a communication line 44. The controller 42 may be part of a control system 46, and may reside in whole or in part on the hydraulic fracturing rig 40, the data monitoring system 27 or elsewhere relative to the site 10. The controller 42 and control system 46 include hardware and software for receiving, sending, processing, analyzing and/or storing data, such as in the form of signals, regarding all or portions of the hydraulic fracturing process. As described in more detail below, the controller 42 may be programmed to receive and analyze torque measurement data and identify a pump failure mode based on the torque measurement data. The torque measurement data may be generated by the torque sensor 38 and may be communicated to the controller 42 via the communication line 44. Any of the data, results and other information may be presented on the display 29 of FIG. 1.

Figure 3:
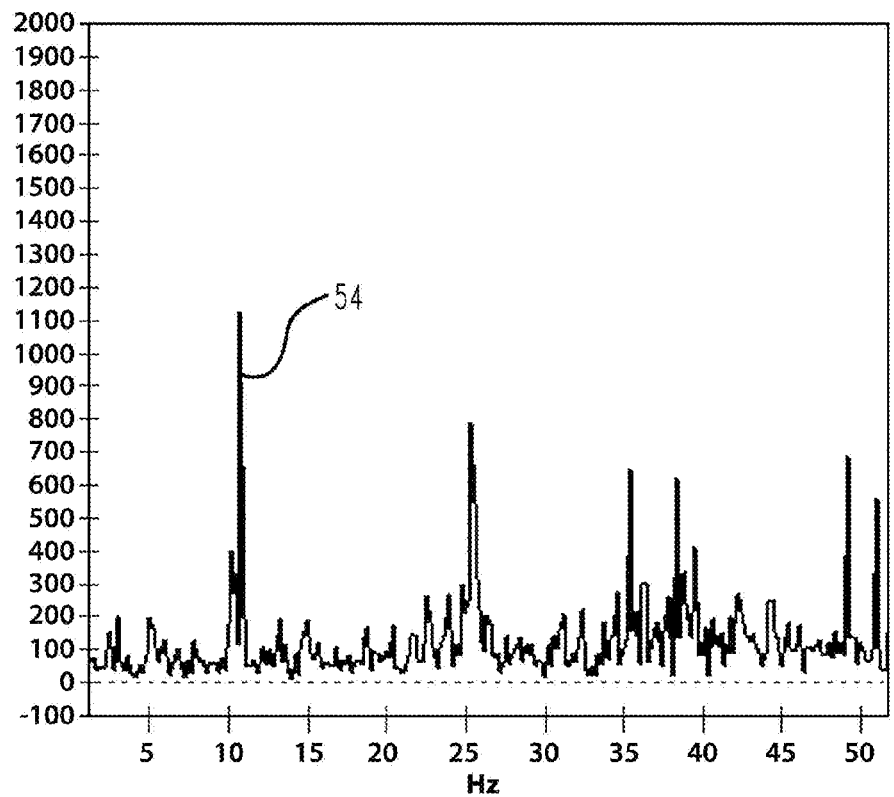
FIG. 3 is a chart depicting exemplary torque measurement data within a frequency domain, according to one aspect of the present disclosure.
Figure 4:
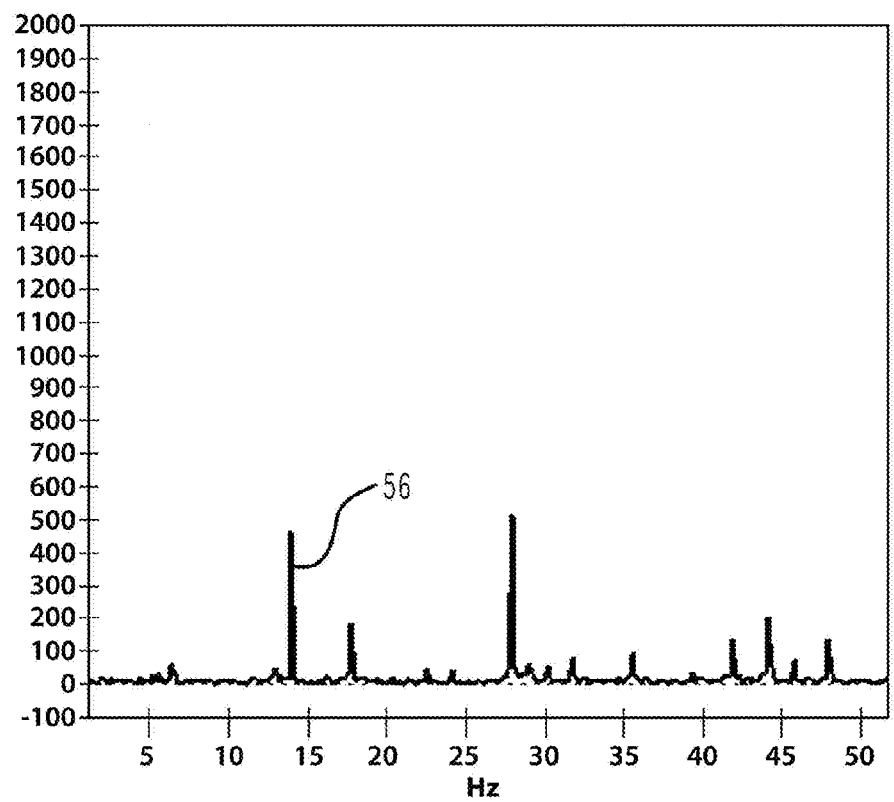
FIG. 4 is a chart depicting exemplary baseline data within a frequency domain, according to another aspect of the present disclosure.

Exemplary torque measurement data, according to the present disclosure, is shown generally in FIGS. 3 and 4. According to the exemplary disclosure, and the exemplary embodiment, the controller 42 discussed above may be programmed to provide a representation of the torque measurement data within a frequency domain. That is, the controller 42 may be programmed to transform and then analyze the torque measurement data. For example, the controller 42 may use and apply a fast Fourier transform (FFT), or other mathematical operator, as is known to those skilled in the art, to the torque measurement data to transfer the torque measurement data from a time domain, as may be received from the torque sensor 38, to a frequency domain.

As is disclosed herein, the controller 42 may be programmed to compare the torque measurement data received from the torque sensor 38 to a baseline, or other information, to identify a pump failure mode. In particular, a first chart 52 illustrates torque measurement data, or first exemplary torque measurement data 54, received from the torque sensor 38. The first exemplary torque measurement data 54, which may be in the form of an electronic signal, is depicted as a frequency domain representation (i.e., amplitude, expressed in decibels along the Y-axis, as a function of frequency, expressed as hertz along the X-axis) of torque measurement data received from the torque sensor 38.

This first exemplary torque measurement data 54 may be compared to a baseline, or first exemplary baseline data 56, shown in FIG. 4 in a second chart 58. The first exemplary baseline data 56 may be an electronic signal representation of ideal operation (e.g., operation that does not indicate a pump failure mode), or a range of signals representing ideal operation, of the driveshaft 36 and, thus, hydraulic fracturing pump 34. The first exemplary baseline data 56, also depicted as newton meters as a function of frequency, may represent operation according a set of operating parameters, including, for example, pressure or engine speed, matching operating parameters of the torque measurement data being analyzed.

According to the exemplary embodiment, the controller 42 may be programmed to identify a pump failure mode or, more particularly, a pump cavitation event if the first exemplary torque measurement data 54 in the frequency domain varies at least a predetermined amount from the first exemplary baseline data 56. According to the exemplary embodiment, the first exemplary torque measurement data 54 in FIG. 3 may indicate a pump cavitation event due to the variance of the data. For example, according to one embodiment, the frequency amplitude of the first exemplary torque measurement data 54 may be analyzed and, if the first exemplary torque measurement data 54 is greater than 500 decibels a pump failure mode may be indicated.

Figure 5:
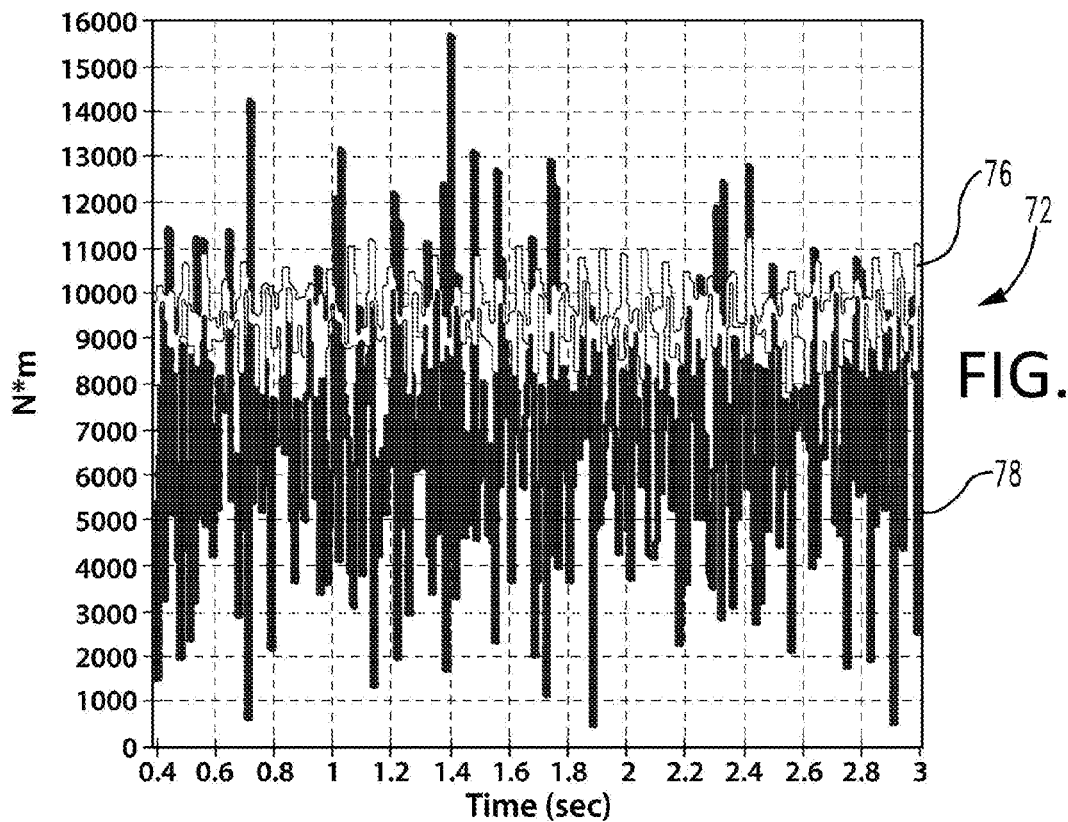
FIG. 5 is a chart depicting exemplary torque measurement data and exemplary baseline data within a time domain, according to another aspect of the present disclosure.
Figure 6:
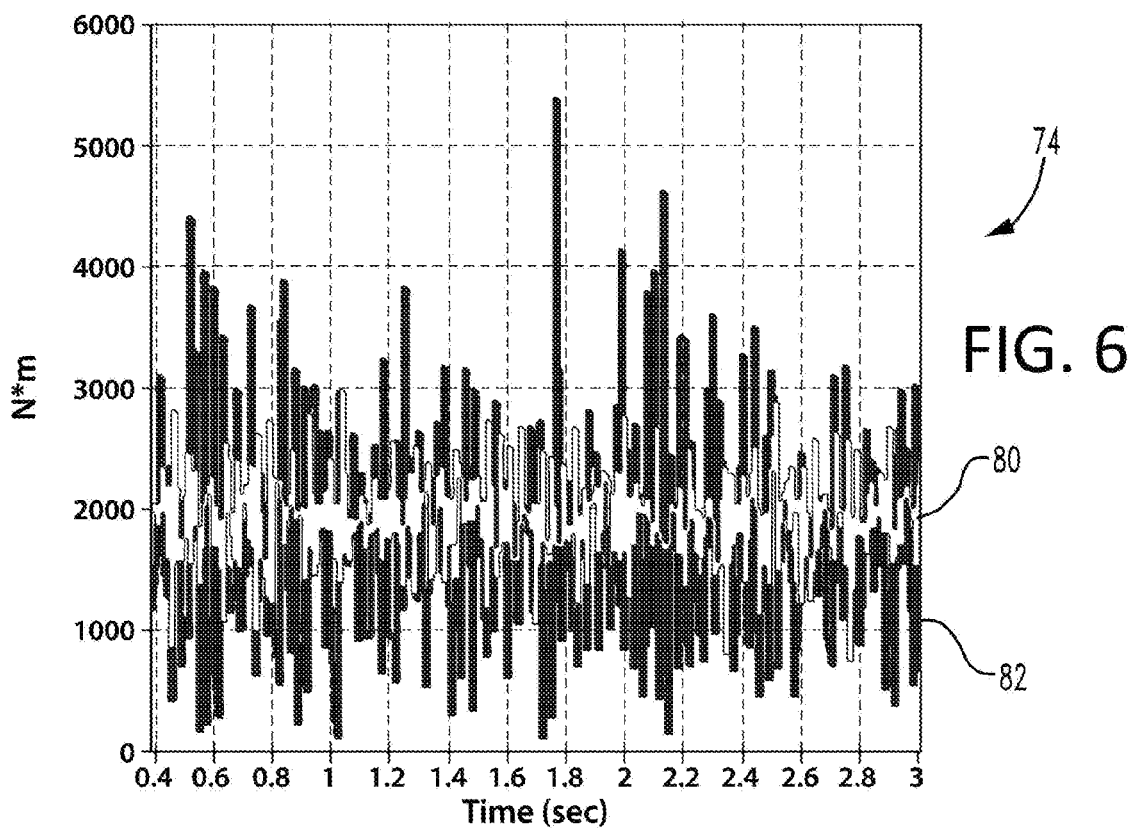
FIG. 6 is another chart depicting exemplary torque measurement data and exemplary baseline data within a time domain, according to another aspect of the present disclosure.

Turning now to FIGS. 5 and 6, torque measurement data, depicted according to a time domain representation (i.e., force, expressed in newton meters along the Y-axis, as a function of time, expressed as seconds along the X-axis) is shown. According to an exemplary embodiment of the present disclosure, a third chart 72 (FIG. 5) and a fourth chart 74 (FIG. 6) both illustrate torque measurement data, or electronic signals, received from the torque sensor 38 during a pump failure mode or, more particularly, a pump cavitation event.

In the third chart 72, both second exemplary baseline data 76 and second exemplary torque measurement data 78 are shown. In FIG. 5 and also FIGS. 6-8, "baseline data" is shown in outline, while "exemplary torque measurement data" is shown in solid fill. The controller 42 may be programmed to compare the second exemplary torque measurement data 78 to the second exemplary baseline data 76 to determine whether a pump failure mode exists. For example, according to one embodiment, a peak-to-peak value of greater than 300 may indicate a pump failure mode. According to the exemplary embodiment of FIG. 5, the second exemplary torque measurement data 78 in the third chart 72 may indicate a pump cavitation event. In the fourth chart 74 of FIG. 6, third exemplary baseline data 80 and third exemplary torque measurement data 82 are shown. According to the exemplary embodiment of FIG. 6, the third exemplary torque measurement data 82 may also indicate a pump cavitation event.

Figure 7:
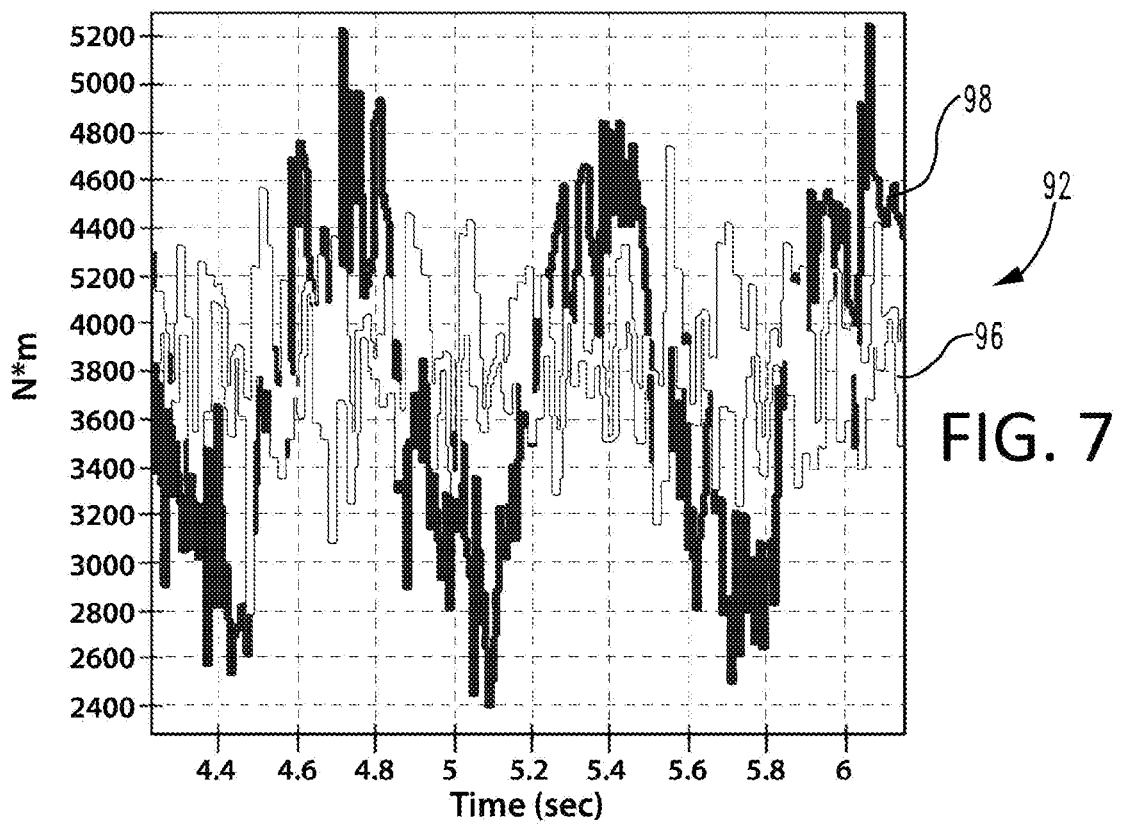
FIG. 7 is another chart depicting exemplary torque measurement data and exemplary baseline data within a time domain, according to another aspect of the present disclosure.
Figure 8:
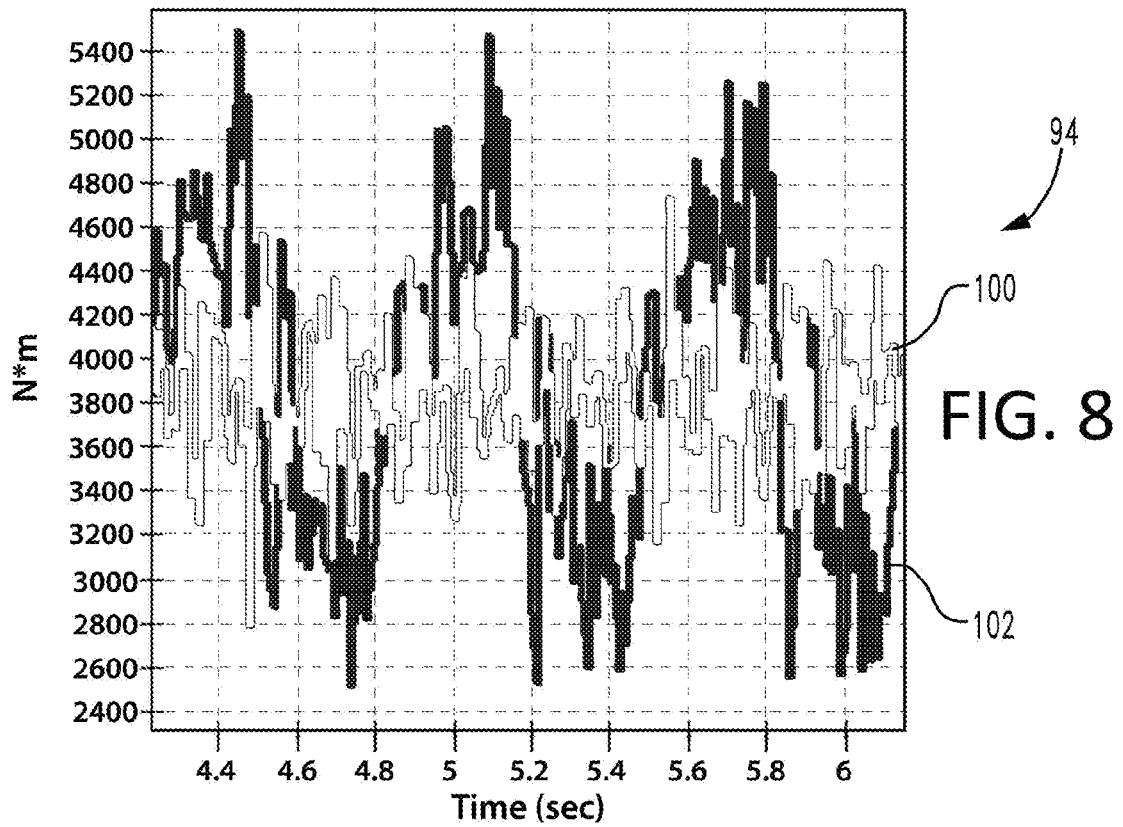
FIG. 8 is another chart depicting exemplary torque measurement data and exemplary baseline data within a time domain.
Figure 9:
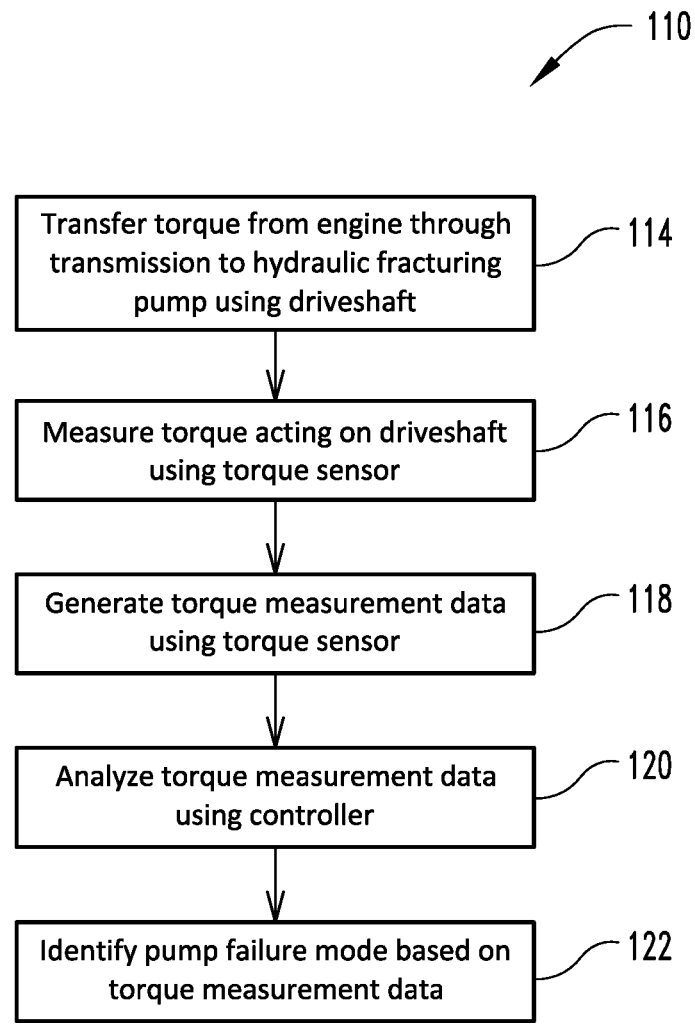
FIG. 9 is a flow diagram representing a method for detecting a pump failure mode of the hydraulic fracturing system of FIG. 2, according to another aspect of the present disclosure.

In FIGS. 7 and 8, respective fifth and sixth charts 92 and 94 are shown, representing torque measurement data in a time domain (i.e., force, expressed in newton meters along the Y-axis, as a function of time, expressed as seconds along the X-axis). The fifth chart 92 depicts fourth exemplary baseline data 96 representing ideal operation and fourth exemplary torque measurement data 98 representing operation during a pump failure event or, more particularly, a leakage event. The sixth chart 94 depicts fifth exemplary baseline data 100 representing ideal operation and fifth exemplary torque measurement data 102 representing operation during a leakage event.

It has been observed that there is low frequency content when a leakage event occurs. However, peak-to-peak values of greater than 1600, for example, may indicate a leakage event. It should be appreciated that threshold values for indicating a pump failure mode may vary depending on different operating conditions of the hydraulic fracturing system 22. It has also been observed that during a leakage event, sine wave patterns may differ from those produced during normal operation. As such, pattern recognition or band-pass filters may be used to additionally or alternatively used to identify a leakage event.

INDUSTRIAL APPLICABILITY

The present disclosure relates generally to a hydraulic fracturing system. More particularly, the present disclosure relates to operation of a hydraulic fracturing pump of the hydraulic fracturing system. Yet further, the present disclosure is applicable to a system and method for monitoring the hydraulic fracturing pump and identifying current, upcoming or potential failure modes of the pump.

Referring generally to FIGS. 1-6, a hydraulic fracturing system 22 generally includes an engine 30, transmission 32, hydraulic fracturing pump 34 and a driveshaft 36 coupled between the transmission 32 and the hydraulic fracturing pump 34 to transfer torque from the engine 30 to the hydraulic fracturing pump 34. Currently, hydraulic fracturing systems do not include systems or methods for monitoring operations of hydraulic fracturing pumps. As such, maintenance, failure and unwanted down time may occur.

According to the present disclosure, a system and method for identifying a failure mode, or pump failure mode, of the hydraulic fracturing pump 34 is provided. In particular, the hydraulic fracturing system 22 disclosed herein includes a torque sensor 38 positioned and configured to measure torque acting on the driveshaft 36. The torque sensor 38 may measure torque and transmit torque measurement data in the form of an electronic signal. A control system 46 and, more particularly, a controller 42 of the hydraulic fracturing system 22 is programmed to receive and analyze the torque measurement data from the torque sensor 38 and identify a pump failure mode based on the torque measurement data. The pump failure mode may include, among other atypical or undesired operation modes, a potential or occurring pump cavitation event and leakage event.

Referring to FIG. 6, and also referencing FIGS. 1-5, a method of detecting a pump failure mode of the hydraulic fracturing system 22 is described. The method is illustrated as a flow diagram 110 and may be implemented in whole or in part by the control system 46. All or portions of the method may run continuously or intermittently, such as at predetermined intervals. The method includes transferring torque from the engine 30 through the transmission 32 to the hydraulic fracturing pump 34 using the driveshaft 36, shown in box 114.

In box 116, torque acting on the driveshaft 36 is measured using the torque sensor 38. The torque sensor 38 may be positioned and configured to measure the torque and, as shown in box 118, generate torque measurement data. The torque measurement data may be transmitted via communication line 44 to the controller 42. In box 120, the torque measurement data is received at and analyzed by the controller 42, which is programmed accordingly. The controller 42 may be further configured to identify a pump failure mode based on the torque measurement data, in box 122, as discussed below.

The pump failure mode may be any undesirable operation of the hydraulic fracturing pump 34, which may be detected by the torque sensor 38 before or during occurrence of the event. Some examples of a pump failure mode include a pump cavitation event and a leakage event. It has been determined that performance of the driveshaft 36 will be abnormal when the hydraulic fracturing pump 34 begins operating in an undesirable manner. For example, an increase in vibrations, propagating back through the driveshaft 36, may indicate that a failure mode is occurring or will occur.

By analyzing the torque measurement data, detected by the torque sensor 38 of torque acting on the driveshaft 36, the controller 42 may identify a pump failure mode and, as such, may reduce significant down time of the hydraulic fracturing operation. The torque measurement data may be compared to data generated during ideal operation of the hydraulic fracturing pump 34 to identify the pump failure mode, with the data being analyzed in the time domain, the frequency domain or both.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A hydraulic fracturing system with pump failure detection, including:
   an engine;
   a transmission;
   a hydraulic fracturing pump;
   a driveshaft coupled between the transmission and the hydraulic fracturing pump to transfer torque from the engine to the hydraulic fracturing pump;
   a torque sensor positioned and configured to measure torque acting on the driveshaft, the torque sensor generating torque measurement data; and
   a controller programmed to analyze the torque measurement data and identify a pump failure mode based on the torque measurement data.

2. The hydraulic fracturing system of claim 1, wherein the controller is further programmed to provide a representation of the torque measurement data within a frequency domain.

3. The hydraulic fracturing system of claim 2, wherein the controller is further programmed to apply a fast Fourier transform to the torque measurement data.

4. The hydraulic fracturing system of claim 2, wherein the controller is further programmed to compare the torque measurement data in the frequency domain to a baseline to identify the pump failure mode.

5. The hydraulic fracturing system of claim 4, wherein the controller is further programmed to identify a pump cavitation event if the torque measurement data in the frequency domain varies at least a predetermined amount from the baseline.

6. The hydraulic fracturing system of claim 1, wherein the controller is further configured to compare an amplitude of the torque measurement data to a baseline to identify the pump failure mode.

7. The hydraulic fracturing system of claim 6, wherein the pump failure mode may include one or both of a pump cavitation event and a leakage event.

8. The hydraulic fracturing system of claim 1, wherein the pump failure mode may include one or both of a pump cavitation event and a leakage event.

9. The hydraulic fracturing system of claim 1, wherein the torque sensor is a strain gauge.

10. A method for detecting a pump failure of a hydraulic fracturing system, the hydraulic fracturing system including an engine, a transmission, a hydraulic fracturing pump, a driveshaft coupled between the transmission and the hydraulic fracturing pump, a torque sensor, and a controller, the method including steps of:
   transferring torque from the engine to the hydraulic fracturing pump using the driveshaft;
   measuring torque acting on the driveshaft using the torque sensor;
   generating torque measurement data using the torque sensor;

analyzing the torque measurement data using the controller; and identifying a pump failure mode based on the torque measurement data.

11. The method of claim 10, further including:

providing a representation of the torque measurement data within a frequency domain using the controller.

12. The method of claim 11, further including:

applying a fast Fourier transform to the torque measurement data using the controller.

13. The method of claim 12, further including:

identifying the pump failure mode by comparing the torque measurement data in the frequency domain to a baseline.

14. The method of claim 13, further including:

identifying a pump cavitation event if the torque measurement data in the frequency domain varies at least a predetermined amount from the baseline.

15. The method of claim 10, further including:

comparing an amplitude of the torque measurement data to a baseline to identify the pump failure mode.

16. The method of claim 15, further including:

comparing the amplitude of the torque measurement data to the baseline to identify one or both of a pump cavitation event and a leakage event.

17. A control system for a hydraulic fracturing system with pump failure detection, including:

a controller programmed to:

receive torque measurement data representative of torque acting on a driveshaft coupled between a transmission and a hydraulic fracturing pump;

convert the torque measurement data from a time domain to a frequency domain; and identify a pump failure mode based on the torque measurement data in the frequency domain.

18. The control system of claim 17, further including a strain gauge positioned and configured to measure the torque acting on the driveshaft.

19. The control system of claim 17, wherein the controller is further programmed to:

identify the pump failure mode by comparing the torque measurement data in the frequency domain to a baseline.

20. The control system of claim 19, wherein the controller is further programmed to:

identify a pump cavitation event if the torque measurement data in the frequency domain varies at least a predetermined amount from the baseline.

* * * * *